United States Patent [19]

Lungershausen et al.

[11] Patent Number: 5,633,672
[45] Date of Patent: May 27, 1997

[54] REAL-TIME CALIBRATION OF PROCESSLESS WRITER

[75] Inventors: Arnold Lungershausen, West Henrietta; Stephen C. Arnold, Honeoye Falls; Timothy M. Enders; John R. Cardone, both of Rochester, all of N.Y.

[73] Assignee: Eastman Kodak Company, Rochester, N.Y.

[21] Appl. No.: 601,418

[22] Filed: Feb. 14, 1996

Related U.S. Application Data

[63] Continuation of Ser. No. 304,963, Sep. 13, 1994, abandoned.
[51] Int. Cl.$^6$ .................. B41J 2/47; B41J 2/435; G11B 7/00; H04N 1/23
[52] U.S. Cl. .................. 347/234; 347/242; 347/243; 347/244
[58] Field of Search .................. 347/242, 243, 347/244, 252, 258, 248, 234, 257

[56] References Cited

U.S. PATENT DOCUMENTS

| | | | |
|---|---|---|---|
| 4,347,785 | 9/1982 | Chase et al. | 347/257 |
| 4,435,055 | 3/1984 | Berdat et al. | 347/257 |
| 4,727,381 | 2/1988 | Bille et al. | 347/234 |

*Primary Examiner*—Benjamin R. Fuller
*Assistant Examiner*—Raquel Yvette Gordon
*Attorney, Agent, or Firm*—Thomas H. Close

[57] ABSTRACT

A real-time calibration instrument on a processless writing device reads a pattern of marks produced by the device and adjusts writing parameters in real time through feed back mechanisms to modify the characteristics of the marks and their pattern. The calibration instrument includes a photoelectronic camera defining an optical axis perpendicular to the recording medium, and the marks are illuminated coaxially along the same axis to capture an image of the marks without distortion. According to other features, the recording medium is rotated on a drum relative to the recording head and the illumination is provided by a stroboscopic source synchronized with rotation of the drum.

8 Claims, 4 Drawing Sheets

REAL-TIME CALIBRATION OF PROCESSLESS WRITER

This is a continuation of application Ser. No. 08/304,963, filed Sep. 13, 1994 abandoned.

CROSS-REFERENCE TO RELATED APPLICATIONS

Reference is made to commonly assigned, copending U.S. patent application Ser. No. 08/288,377, entitled Interleaved Multi Channel Recording, filed Aug. 10, 1994, in the names of Stephen C. Arnold et al., the disclosure of which hereby is incorporated by reference into the present application.

BACKGROUND OF THE INVENTION

1. Field of the Invention

The invention relates to the calibration of writing systems and more specifically to such systems that are modulated to mark a recording medium in a pattern determined by stored information, and to calibration mechanisms for adjusting the writing parameters in real time to modify the characteristics of the marks and their pattern on the medium.

2. Description of the Prior Art

Writing devices are well known for visibly marking a recording medium in response to a signal representing an image or other information. Typical devices convert magnetic or electronic information into a visible pattern on the recording medium. The medium often is rotated relative to a writing head, while the writing head is modulated by the signal, to generate a linear pattern of marks defining raster lines. The head is indexed between rotations to produce parallel raster lines that together define the image. The marks are produced on the media by numerous available technologies including optical energy focused to expose film, inks directed onto the surface of paper, and thermal energy that initiates chemical changes in film and paper.

PROBLEM SOLVED BY THE INVENTION

Calibration of existing media writers often is delayed and cumbersome. Recorded images are removed from the writing device and analyzed off-line for the characteristics of the marks and their pattern. Spatial and density relationships are determined, and adjustments are made in the parameters of the writing process. These sequential steps are repeated until the image properly reflects the original or desired information.

Other calibration techniques are not available in real-time, do not calibrate individual writing devices, or do not permit concurrent and continuous calibration with feedback control during the production of the image.

SUMMARY OF THE INVENTION

The present invention is directed to overcoming one or more of the problems set forth to provide real-time, on-line calibration of individual writing devices. Briefly summarized, according to one aspect of the invention, apparatus is provided for converting information from a communication channel into marks on a recording medium. The apparatus includes a writing head coupled to the channel and modulated by the signal for marking the medium in response to the signal. A drive produces relative movement between the media and the writing head to establish a pattern of marks on the medium in the direction of the movement. A calibration instrument reads the pattern of marks and adjusts parameters of the writing head in real time to calibrate the head and modify the characteristics of the marks and their pattern.

According to certain features, the calibration instrument includes a photoelectronic camera defining an optical axis, and the marks are illuminated coaxially along the same axis to capture an image of the marks without distortion. According to other features, the recording medium is rotated on a drum relative to the recording head and the illumination is provided by a strobe flash that illuminates the marks in synchronization with rotation of the drum.

The invention provides an improved calibration mechanism that operates in real time on the very apparatus that generates the image. Calibration can be completed during a test before recording a desired image or concurrently with image recording. Feedback and control mechanisms permit adjustment of the writing parameters during the writing process.

DESCRIPTION OF THE PREFERRED EMBODIMENTS

Figure 2:
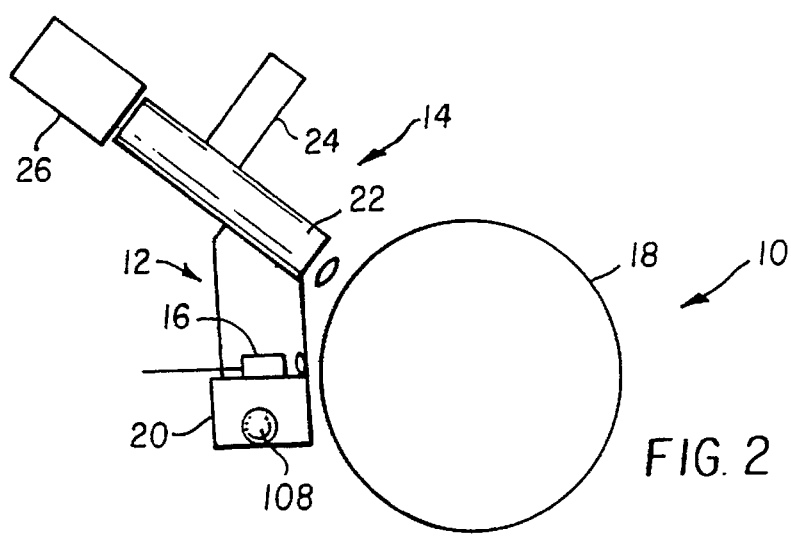
FIG. 2 is a schematic view of the recording apparatus and calibration instrument of FIG. 1.

Referring now to the drawings, and starting with FIG. 2, a preferred embodiment of the invention is disclosed including a media support 10, writing assembly 12, and calibration instrument 14.

The writing assembly 12 is adapted to retrieve images or other source information stored in magnetic or electronic form and to modulate a signal in accordance with the retrieved information. The modulated signal drives an appropriate writing device 16 for marking the media and thereby converts the source information into a visible representation. The support 10 and writing device 16 are moved relative to one another by a rotating drum 18 that distributes the marks in a linear pattern referred to as a raster line. Actually, the writing assembly is a multi-channel device, and several parallel raster lines are recorded essentially simultaneously. The writing device 16 and media support 10 also are indexed relative to one another by a carriage 20. Indexing displaces the writing device 16 laterally in a second direction, parallel to the drum rotational axis, and builds the image or other visible representation with successive sets of raster lines. The final product is defined by an array of marks or dots that are arranged in parallel raster lines and have a density controlled by the modulated signal.

The calibration instrument 14 is a direct read-after-write device, and includes a microscope 22, illumination source 24 and electronic camera 26, preferably a charge coupled device (CCD). All are mounted on the same carriage as the writing device 16, but are displaced around the drum in the direction of the raster lines. The axis of the microscope 22 is normal to the surface of the drum and projects an image of the pattern of marks from the recording medium onto a two dimensional array of photoelectric elements in the camera 26. The image is converted on line in real time into an electrical representation that is analyzed for its spatial and density characteristics. Analysis includes line frequency response, spatial resolution and tonal information. Calibration is accomplished by feedback and control mechanisms that act on writing parameters such as the size, relative position and density of the marks. These are controlled, as will become more apparent from the following description, by optical adjustments such as focus, by positional adjustments such as rotation of the writing device or changes in pitch during indexing, and by adjustments in the applied energy level such as laser power.

The invention has particular utility in devices that record on media including a dye that sublimates when exposed to optical energy above a predetermined threshold. Media of this general type are disclosed, for example, in DeBoer U.S. Pat. No. 4,973,572, issued Nov. 27, 1990, and particularly Example 3 thereof. For purposes of this description, the media is in sheet form on a plastic base. It has a maximum density of approximately two and two tenths (2.2 D), and a threshold energy of approximately one tenth of a Joule per square centimeter (0.1 J/cm$^2$). Above the threshold energy, dye in the media sublimates and is removed under vacuum, reducing the density of the media at that spot. Exposures to energy levels of approximately half a Joule per square centimeter (0.5 J/cm$^2$) produce a minimum density of approximately two tenths (0.2D). Photoconductors, thermal or photosensitive film and paper, and ink jet compatible recording papers and films are other examples of media that are suitable for use with the invention.

Figure 1:
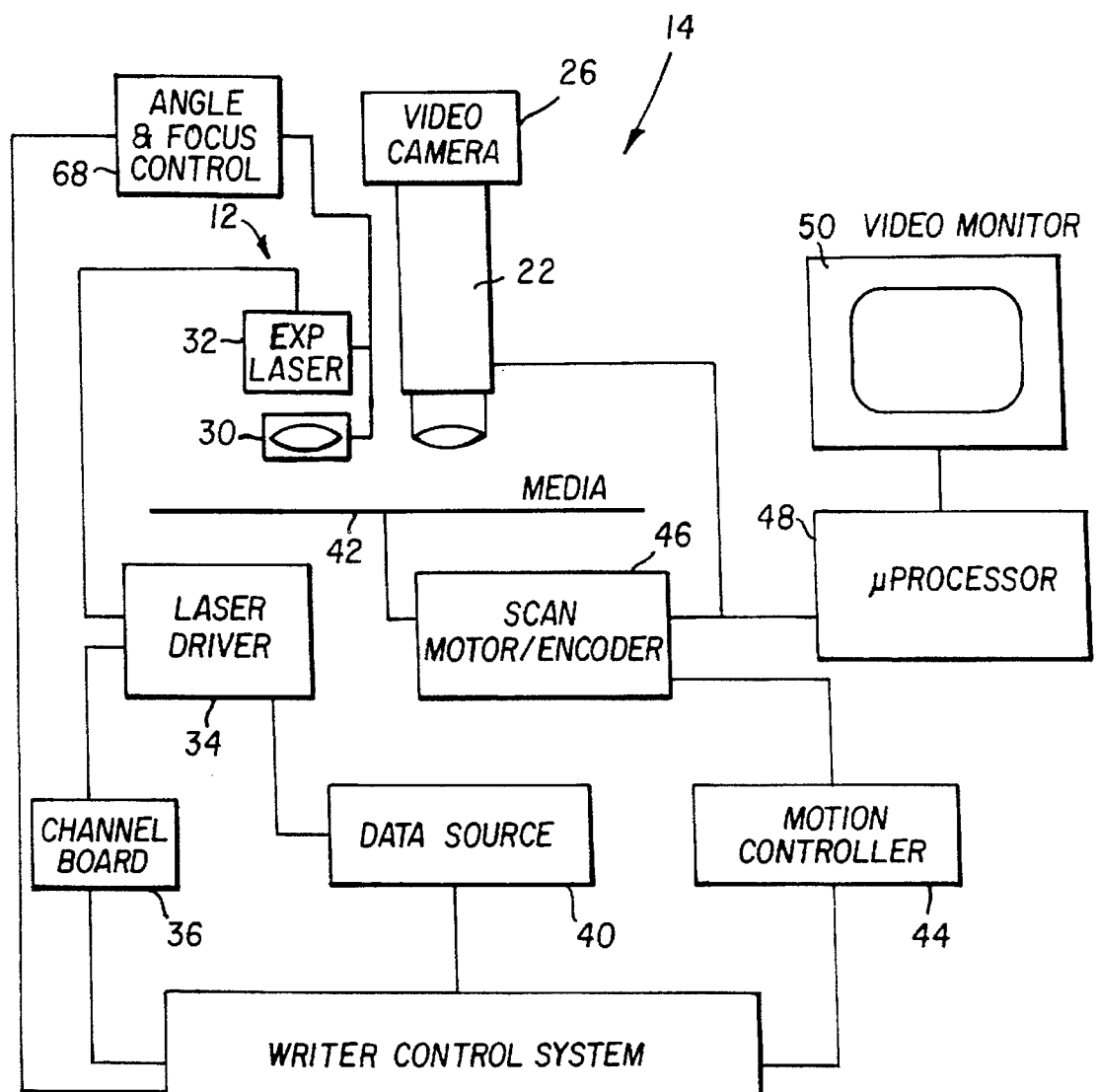
FIG. 1 is a block diagram representing recording apparatus including a calibration instrument in accordance with the present invention.

Referring now to FIG. 1, the writing device includes appropriate optics 30, one or more lasers 32, laser drivers 34, a multi-channel communication link including channel board 36, and a writer control system 38. Information to be recorded is stored in magnetic or electronic form in a data source 40. The information is retrieved from source 40 by control system 38 and is used to generate and deliver multiple channels of modulated signals through channel board 36 to laser driver 34. The laser driver energizes laser 32 in accordance with the modulated signal, and the resulting energy is focused by optics 30 to mark the recording medium 42. A typical mark is a circular spot having a diameter of approximately ten microns and a density that varies according to the energy in the modulated signal. Of course other writing devices might be used with the invention. Examples corresponding to the media alternatives mentioned above might include thermal, ink jet and electrostatic devices.

Rotation of drum 10 (FIG. 2), indexing of the writing device 16 and energization of the laser are synchronized by a motion controller 44 (FIG. 1)and encoder 46 under the direction of the control system 38.

Operation of the calibration instrument 14, including synchronization of its illumination source (FIG. 2), also are controlled by system 38 using information from the encoder 46. As will be more apparent from the description that follows, the illumination source is strobed to flash in synchronism with drum rotation. An illuminated image is captured for analysis by a microprocessor 48, including a frame grabber, and is presented for viewing in real time on a monitor 50.

Figure 3:
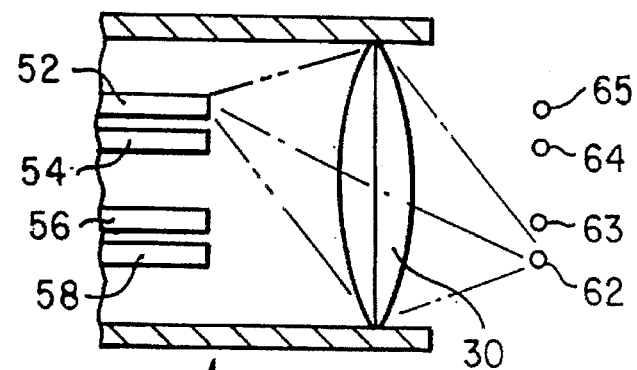
FIG. 3 is a partial and enlarged view of a writing head which is part of the recording apparatus for marking a recording medium.
Figure 4:
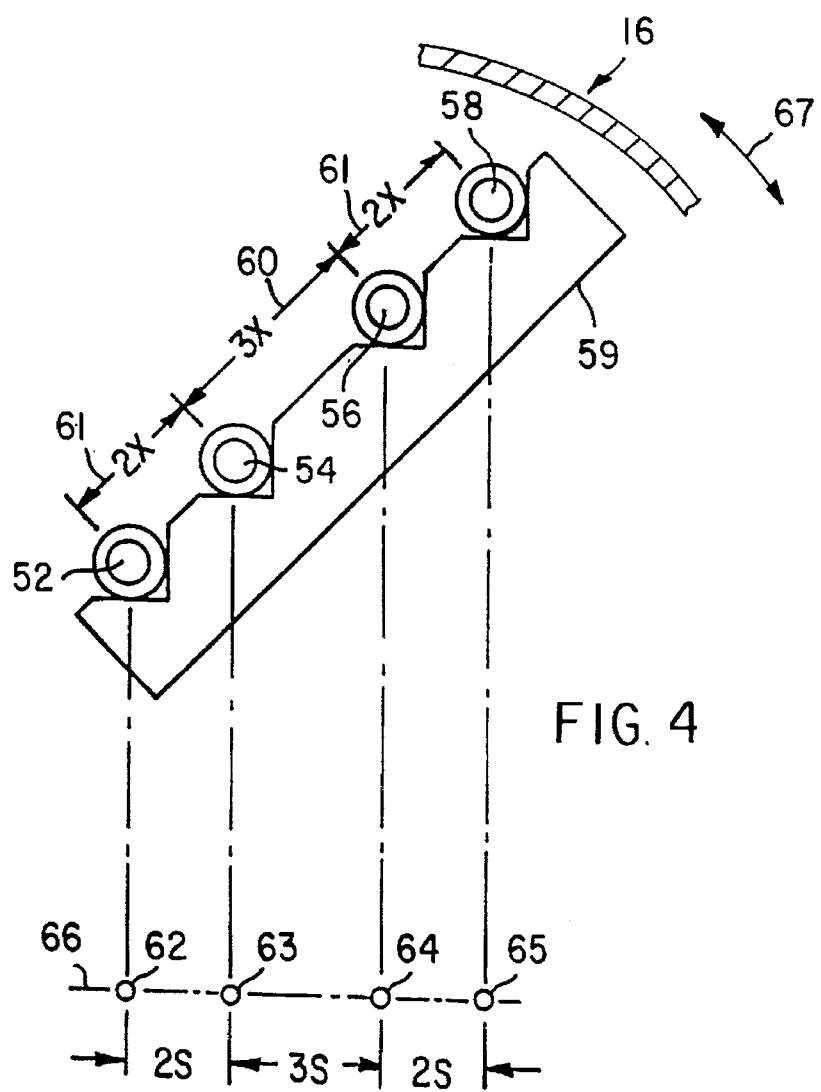
FIG. 4 is a partial and enlarged view of fiber optics forming part of the writing head of FIG. 3.
Figure 5:
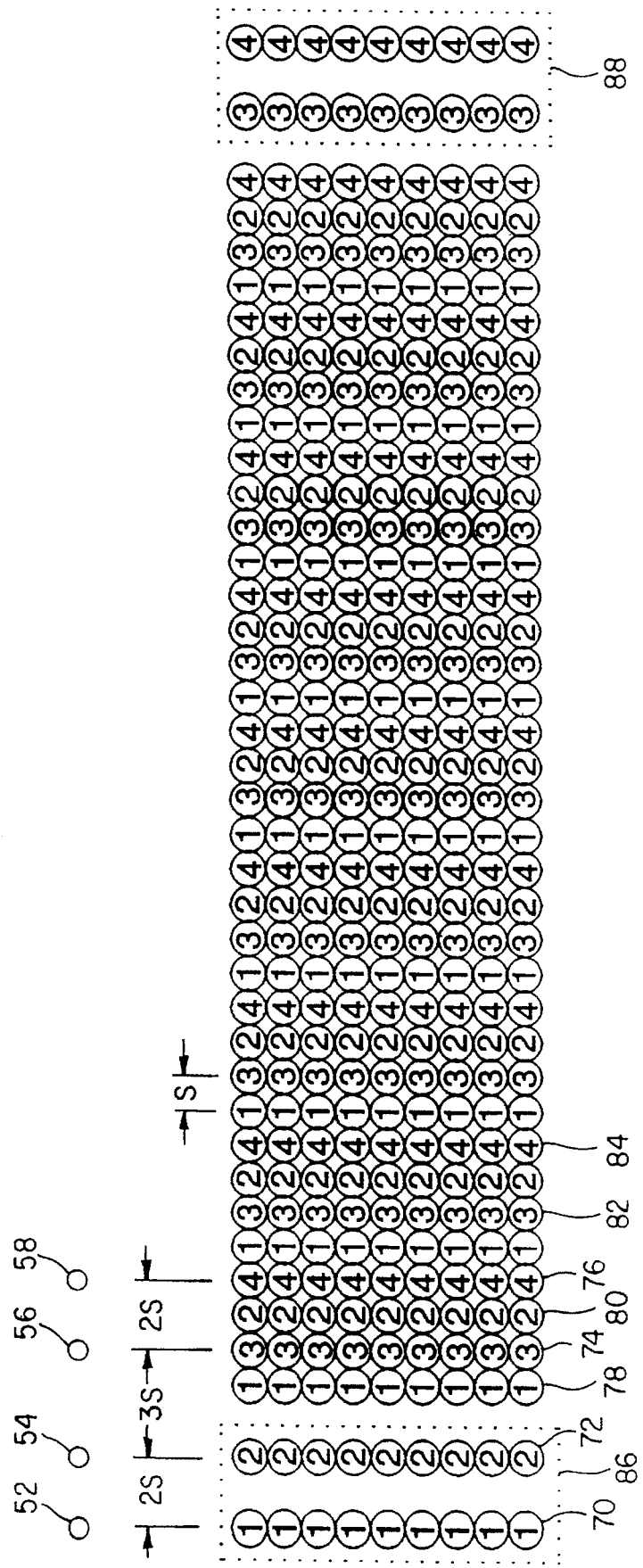
FIG. 5 is a schematic view of a recording medium marked by the writing head.

FIGS. 3–5 illustrate the writing device and marking pattern. Writing device 16 includes a plurality of optical fibers 52, 54, 56 and 58, corresponding to four recording channels. The optical fibers are supported in a harness 59 (FIG. 4) defining a linear array or pattern having a central section 60 and end sections 61. The two adjacent fibers in the central section are spaced a distance of 3x, while adjacent optical fibers in the end sections are equally spaced a distance of 2x. X is equal to the raster line pitch times a constant that depends on the angle of the optical array relative to the drum axis of rotation.

Optical energy is transmitted from one or more lasers 32 (FIG. 1), through the optical fibers 52, 54, 56, and 58 (FIGS. 3 and 4), and is focused by one or more optical elements 30 into a pattern of spots 62, 63, 64, and 65, at the exposure position. The spots define a pattern, depicted at 66 in FIG. 4, that is similar to the array pattern, including a central section and two end sections. Adjacent spots in the central section are spaced a distance of 3s, and adjacent spots in the end sections are equally spaced a distance of 2s, where s is the pitch of the raster lines. The distance between adjacent spots is adjustable, without changing the 3s and 2s relationship, by rotating harness 59 as indicated at 67. Rotational adjustment is provided under the control of system 38 (FIG. 1) through rotation and focus controller FIG. 5 represents the recording medium as it is exposed to individual information elements, sometimes called picture elements or pixels, that are recorded as interleaved sets of raster lines corresponding to the multiple recording channels mentioned above. Drum 18 is rotated relative to the writing device 16 to scan the spot pattern 62, 63, 64 and 65 across the surface of the recording medium. The modulated energy transmitted by the optical fibers exposes and marks the medium on the first revolution to produce a first set of raster lines identified at 70, 72, 74 and 76. The head is then indexed for the second revolution to produce a second set of raster lines identified at 78, 80, 82 and 84. The second set is interleaved with the first set with the first raster line on the second revolution, produced by spot 62, spaced between the centermost raster lines of the first revolution, produced by spots 63 and 64. The identifiers 1, 2, 3 and 4 represent individual information elements recorded on the medium by the corresponding optical fibers 52, 54, 56 and 58, respectively. Regions 86 and 88 represent start and finish regions where the image is discontinuous and normally would be blanked or removed.

Figure 6:
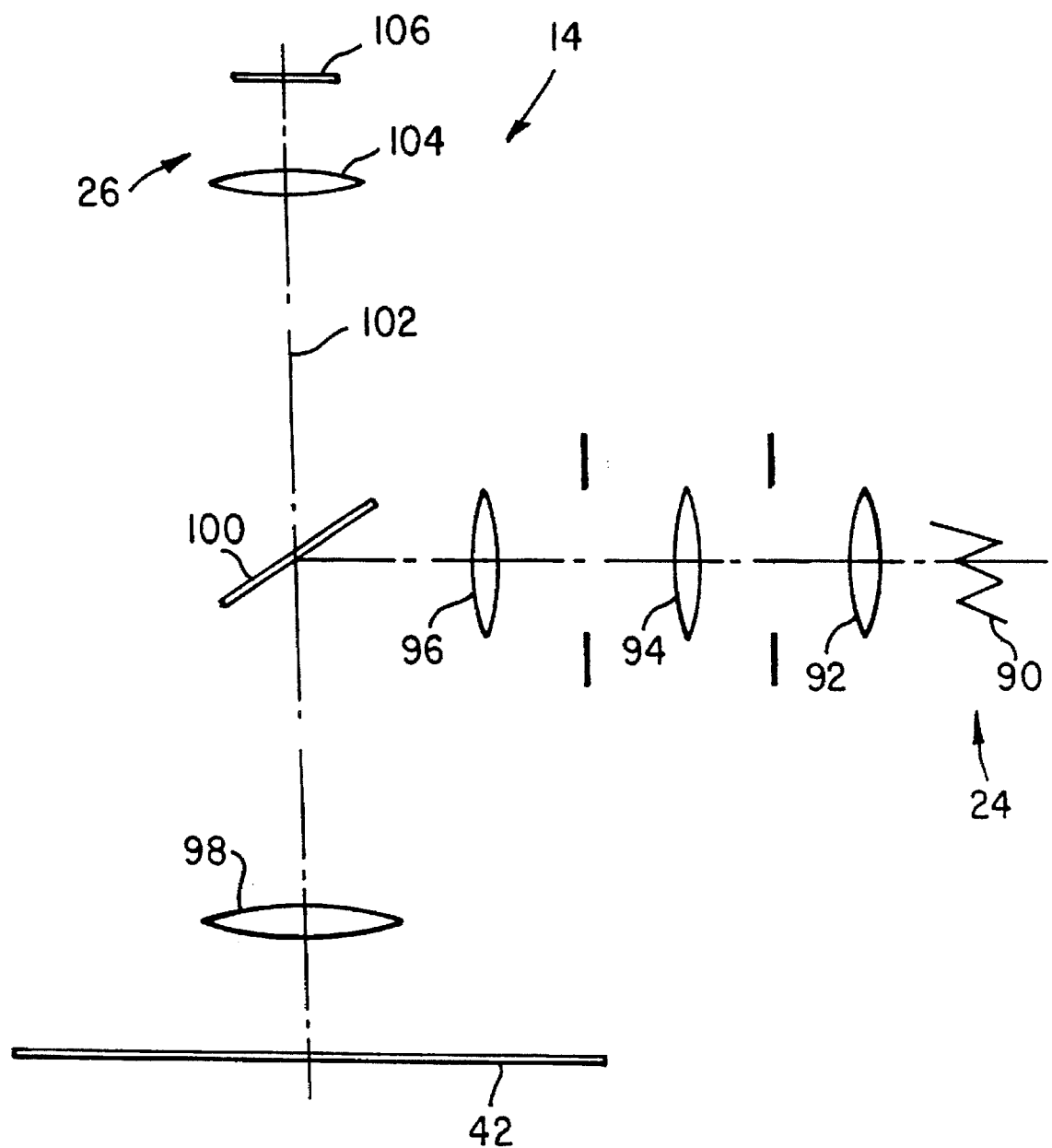
FIG. 6 is a schematic view of the calibration instrument depicting a coaxial arrangement of illumination and imaging paths according to the preferred embodiment.

Referring now to FIG. 6, the elements of the calibration instrument are depicted schematically including illumination source 24 and electronic camera 26. The recorded pattern is illuminated with energy from filament 90 that is projected onto the media through optical elements 92, 94, 96, 98 and 100. Optical element 92 is a condensor lens. Elements 94 and 96 are relay lenses. Element 98 is an objective lens, and element 100 is a beam splitter that is adjustable for field polarity. The beam splitter 100 passes the illuminated image along axis 102 through optical element 104 a projection lens, to photoelectric elements 106 in the image plane of camera 26. The system provides bright field, dark field or interference contrast Kohler illumination perpendicular to the recording medium and coaxial with the axis 102 of the electronic camera.

Filament 90 is an element of a strobe flash device that is synchronized through control system 38 (FIG. 1) to flash once with each rotation of drum 18. A two dimensional image of the recorded marks and their pattern is captured with each rotation for analysis by the microprocessor 48 and for presentation on monitor 50. Image blur is controlled by the flash pulse width. Intensity is controlled by lamp voltage. Timing and synchronization are controlled by a clock in the writer control system. Magnification also can be selected by interchangeable lenses in the microscope.

Microprocessor 48 (FIG. 1) analyses the image electronically for desired characteristics including modulation transfer function, spatial relationships, focus and density characteristics. Appropriate adjustments are then made through the various feedback and control mechanisms represented in FIG. 1. The scan rate is adjusted by encoder 46 and motion controller 44, which determine the relationship between drum rotation and writing speed. Raster is controlled by adjusting the rotational angle 67 (FIG. 4) of the harness 59 and by lead screw 108 (FIG. 2). These adjustments are controlled through angle and focus control 68 (FIG. 1), which also adjusts the focus of optical system 30. Laser energy is adjusted through the laser driver 34. In this manner marking characteristics, such as spot size, relative position and density can be altered by adjusting the noted recording parameters.

Calibration in accordance with the invention can be accomplished during set-up and continuously while the intended image is recorded. Adjustments are made on line, in real-time, without removing the recording medium from the recording device, and any applied adjustments can be recorded for retention with the finished product.

While the invention is described in connection with a preferred embodiment, other modifications and applications will occur to those skilled in the art. The claims should be interpreted to fairly cover all such modifications and applications within the true spirit and scope of the invention.

PARTS LIST FOR FIGURES

| Reference No. | Part |
| --- | --- |
| 10 | Media support. |
| 12 | Writing assembly. |
| 14 | Calibration instrument. |
| 16 | Writing device. |
| 18 | Drum. |
| 20 | Carriage. |
| 22 | Microscope. |
| 24 | Illumination source. |
| 26 | Camera. |
| 30 | Optics. |
| 32 | Lasers. |
| 34 | Laser drivers. |
| 36 | Channel board. |
| 38 | Control system. |
| 40 | Data source. |
| 42 | Recording medium. |
| 44 | Motion controller. |
| 46 | Encoder. |
| 48 | Microprocessor. |
| 50 | Monitor. |
| 52 | Optical fiber. |
| 54 | Optical fiber. |
| 56 | Optical fiber. |
| 58 | Optical fiber. |
| 59 | Harness. |
| 60 | Central section. |
| 61 | End sections. |
| 62 | Energy spot. |
| 63 | Energy spot. |
| 64 | Energy spot. |
| 65 | Energy spot. |
| 66 | Pattern. |
| 67 | Rotational angle. |
| 68 | Rotation and focus controller. |
| 70 | Raster line (first set). |
| 72 | Raster line (first set). |
| 74 | Raster line (first set). |
| 76 | Raster line (first set). |
| 78 | Raster line (second set). |

-continued

PARTS LIST FOR FIGURES

| Reference No. | Part |
| --- | --- |
| 80 | Raster line (second set). |
| 82 | Raster line (second set). |
| 84 | Raster line (second set). |
| 86 | Start region. |
| 88 | Finish region. |
| 90 | Filament. |
| 92 | Optical element. |
| 94 | Optical element. |
| 96 | Optical element. |
| 98 | Optical element. |
| 100 | Beam splitter. |
| 102 | Optical axis. |
| 104 | Projection lens. |
| 106 | Photoelectric elements. |
| 108 | Lead screw. |

What is claimed is:

1. Apparatus for writing an image having desired characteristics on a recording medium, the medium producing visible marks when exposed to radiation above a threshold level; said apparatus comprising:

a communication channel for carrying an information signal representing the image being written;

a writing head coupled to said channel and modulated by the signal for making marks representing the image on the recording medium in response to the signal, the image having the characteristics of line frequency, spatial resolution and tonal information and the marks having parameters of size, relative position and density, said writing head having means for adjusting the parameters for modifying the characteristics of the image represented by the marks;

a drive for producing relative movement in a direction between the recording medium and said writing head to establish a pattern of marks on the recording medium in the direction of the relative movement;

a calibration instrument mounted relative to said writing head for reading the marks directly after they have been written, analyzing the characteristics of the image produced by the pattern of marks continuously while the image is recorded and adjusting the parameters of the marks in real-time to cause the image to have the desired characteristic.

2. The invention of claim 1, wherein the writing head includes a plurality of lasers and optical fibers for making a pattern of marks defining a plurality of parallel raster lines and said calibration instrument analyzes spatial and density information from said pattern.

3. The invention of claim 1, wherein said calibration instrument includes optics for projecting an image of the pattern along an optical axis onto a photosensitive element, said calibration instrument further including means for directing illumination along said optical axis and focusing the illumination onto the pattern.

4. The invention of claim 3, wherein said drive includes a drum rotatable relative to said writing head and said illumination means is strobed to illuminate the pattern in synchronization with the rotation of the drum.

5. The invention of claim 3, wherein said photosensitive element reads spatial and density information from the pattern.

6. Apparatus for writing an image having desired characteristics on a recording medium, the medium producing visible marks when exposed to radiation above a threshold level; said apparatus comprising:

a writing head including means for applying modulated energy to the medium to mark the medium to produce an image, the image having the characteristics of line frequency, spatial resolution and tonal information and the marks having parameters of size, relative position and density, said writing head having means for adjusting the parameters for modifying the image characteristics;

means for producing relative movement between the medium and the writing head for producing a pattern of said marks defining parallel raster lines on the medium; and a calibration instrument including a photoelectric camera and an illumination source for reading the pattern of marks continuously after they have been written while the image is being recorded, analyzing the characteristics of the image produced by the pattern of marks, and producing an output signal for adjusting the parameters of the marks in real time to cause the image to have the desired characteristics.

7. The invention of claim 6, wherein said camera defines an optical axis and said calibration instrument includes means for focusing illumination coaxially along said optical axis onto the pattern to illuminate the pattern.

8. The invention of claim 7, wherein said movement producing means includes a drum rotatable relative to said writing head, and said illumination means is a flash strobe synchronized with rotation of the drum to illuminate the pattern once with each drum rotation.

* * * * *